(12) United States Patent
Darcy et al.

(10) Patent No.: US 7,767,079 B2
(45) Date of Patent: Aug. 3, 2010

(54) AMALGAM SEPARATOR

(76) Inventors: Michael J. Darcy, 3380 Eglinton Avenue West, Mississaugua, Ontario (CA) L5M 7P2; Jean Kay Lubin, 403 Morley Cook Crescent, Newmarket, Ontario (CA) L3X 2M3

( * ) Notice: Subject to any disclaimer, the term of this patent is extended or adjusted under 35 U.S.C. 154(b) by 61 days.

(21) Appl. No.: 11/899,179

(22) Filed: Sep. 5, 2007

(65) Prior Publication Data

US 2008/0053883 A1 Mar. 6, 2008

Related U.S. Application Data

(60) Provisional application No. 60/842,482, filed on Sep. 6, 2006.

(51) Int. Cl.
*C02F 1/28* (2006.01)
*C02F 1/20* (2006.01)

(52) U.S. Cl. .................. 210/188; 210/232; 210/265; 210/282; 210/295; 210/502.1; 210/914

(58) Field of Classification Search ............... 210/188, 210/265, 282, 232, 295, 502.1, 914
See application file for complete search history.

(56) References Cited

U.S. PATENT DOCUMENTS

| | | | |
|---|---|---|---|
| 4,619,744 A | 10/1986 | Horton | |
| 5,080,799 A * | 1/1992 | Yan | 210/661 |
| 5,154,833 A * | 10/1992 | Robinson | 210/664 |
| 5,198,021 A | 3/1993 | Virnig | |
| 5,338,444 A | 8/1994 | Van Buren | |
| 5,340,380 A | 8/1994 | Virnig | |
| 5,401,393 A * | 3/1995 | Whitehurst et al. | 208/251 R |
| 5,478,540 A | 12/1995 | Walles | |
| 5,505,925 A | 4/1996 | Fristad | |
| 5,744,107 A | 4/1998 | Fristad | |
| 5,858,225 A * | 1/1999 | Nerli | 210/232 |
| 5,891,324 A | 4/1999 | Ohtsuka | |
| 5,907,037 A * | 5/1999 | Gujral et al. | 536/59 |
| 6,165,366 A * | 12/2000 | Sarangapani | 210/666 |
| 6,521,131 B1 * | 2/2003 | Hamilton et al. | 210/662 |
| 7,063,793 B2 * | 6/2006 | Albiston et al. | 210/718 |
| 7,166,214 B2 * | 1/2007 | Armstrong et al. | 210/205 |
| 7,332,090 B2 * | 2/2008 | Bender et al. | 210/688 |
| 2005/0279678 A1 * | 12/2005 | Carlson et al. | 210/97 |
| 2006/0065594 A1 * | 3/2006 | Armstrong et al. | 210/606 |
| 2006/0074257 A1 | 4/2006 | Bass | |

FOREIGN PATENT DOCUMENTS

| | | |
|---|---|---|
| CA | 2442513 | 3/2005 |
| WO | WO 0130707 | 5/2001 |

\* cited by examiner

*Primary Examiner*—Duane Smith
*Assistant Examiner*—Paul J Durand
(74) *Attorney, Agent, or Firm*—Howard J. Greenwald

(57) ABSTRACT

An amalgam separator for purifying a waste stream that contains a mixture of air and waste liquid. The amalgam separator contains filter media that comprises a sulfur-impregnated carrier and an ion exchange resin, wherein the ion exchange resin is present at a concentration of from about 25 to about 75 weight percent. During its operation, the amalgam separator separates the waste stream into air and waste liquid portions, purifies the waste liquid portion, and then combines the purified waste liquid portion with the air.

10 Claims, 6 Drawing Sheets

AMALGAM SEPARATOR

CROSS-REFERENCE TO RELATED PATENT APPLICATIONS

This patent application claims priority based upon applicants' provisional patent application 60/842,482, filed on Sep. 6, 2006.

FIELD OF THE INVENTION

An amalgam separator comprised of filter media that is comprised of a sulfur-impregnated carrier and an ion exchange resin, wherein the ion exchange resin is preferably present at a concentration of from about 25 to about 75 weight percent, by combined weight of such carrier and such resin.

BACKGROUND OF THE INVENTION

Amalgam separators are well known to those skilled in the art. Reference may be had, e.g., to Canadian patent application CA 2442513. The Abstract of this Canadian patent application describes "An amalgam separation and collection apparatus for the collecting and separation of amalgam in a dental vacuum waste stream . . ." The amalgam separator unit described in Canadian patent application CA 2442513 was not sufficiently efficient. After such Canadian patent application was filed (on Sep. 23, 2003), an amalgam separator was designed and sold based, in part, upon the technology of such patent application. The separator was sold by Hygenitek Inc., Box 8, Suite 9, Trepassey, Newfoundland, Canada A0A4B0, as model "ARU-10." This "ARU-10" unit comprised a sedimentation chamber and filter media, wherein such filter media was comprised of pelletelized carbon and ionic resin, and wherein said ionic resin was present at a concentration of about 10 weight percent; about 30 ounces of such filter media were present in the device.

Various governmental authorities, such as, e.g., New York State and the State of Rhode Island, have adopted legislation that mandates the use of dental amalgam separation equipment by dentists in such states. In, e.g., New York State, the dental amalgam separation equipment must remove at least 99 weight percent of dental amalgam from the dental waste water flow, at the standard operating flow rate used by the dentist(s).

The legislation mandating the use of such dental amalgam separation equipment is relatively recent, and it has imposed separation standards that are stricter than those previously imposed. The ARU-10 unit was capable of meeting these new, stricter standards; however, such unit was not reliable and is currently not being manufactured.

One of the reasons for the stricter separation standards is that mercury can cause serious health problems. The United States Agency for Toxic Substances and Disease Registry (ATSDR) and United States Environmental Protection Agency have issued a joint alert to the public regarding the hazards of mercury to the general public. Mercury can cause serious health problems, especially in children and fetuses. Health effects can result from short-term or long-term exposure. Exposure can cause harm before symptoms arise. When symptoms do arise, health problems can include tremors, changes in vision or hearing, insomnia, weakness, difficulty with memory, headache, irritability, shyness and nervousness. In young children, exposure to metallic mercury can damage the central nervous system. Long-term mercury exposure can cause children to have trouble learning in school.

Exposure to metallic mercury occurs primarily from breathing contaminated air. Other forms of mercury (e.g., methyl mercury compounds) can be absorbed by eating food (like fish), drinking water, and from skin contact.

Because of the health dangers presented by mercury in its many forms, more and more governmental jurisdictions are requiring that dentists have equipment adapted to remove at least 99 weight percent of the dental amalgam from the dental waste water flow.

It is an object of this invention to provide an amalgam separator that it is capable of removing at least 99 weight percent of the dental amalgam from the dental waste water flow and that, additionally, is durably efficient for a period of at least about 1 year. It is another object of this invention to provide an amalgam separator that is durably efficient for a period of at least about 2 years. It is yet another object of this invention to provide an amalgam separator that is durably efficient for a period of at least 11 months.

SUMMARY OF THE INVENTION

In accordance with this invention, there is provided an amalgam separator comprised of filter media that is comprised of a sulfur-impregnated carrier and an ion exchange resin, wherein the ion exchange resin is present at a concentration of from about 25 to about 75 weight percent, by combined weight of such carrier and such resin. The amalgam separator also is preferably comprised of a sedimentation chamber.

BRIEF DESCRIPTION OF THE DRAWINGS

The invention will be described by reference to the drawings, in which like numerals refer to like elements, and in which.

DESCRIPTION OF THE PREFERRED EMBODIMENTS

In one preferred embodiment of the invention, there is provided an amalgam collection and separation apparatus that is used to collect and purify the total mixture of liquid and solid particulate matter typically found in a dental vacuum stream. This device generally is comprised of: (a) a container having a lid which incorporates a chamber to allow separation of liquid and air in the waste stream and has an interconnection orifice, (b) a sedimentation chamber which allows the settling of heavy particles in the liquid waste stream, and (c) a filtration chamber which incorporates a mixed active media bed for the removal of fine and dissolved particles of mercury and other wastes in the liquid waste stream. The filtration chamber also preferably incorporates a purified water and vacuum air re-entrainment area under its perforated base, and inside the base of the external housing of the apparatus, for the reintroduction of purified wastewater to the vacuum air stream.

The preferred amalgam collection device also may contain a vacuum air exit pipe which permits the flow of vacuum air through the unit and re-entrainment of vacuum air and water prior to exiting the apparatus. Additionally, it may contain a removable plastic inner sleeve which mimics the interior of the exterior body and is a combination of the sedimentation chamber, a cleaned (distilled) water overflow fin, and a filtration chamber with a perforated bottom to support the mixed active media bed.

Figure 1:
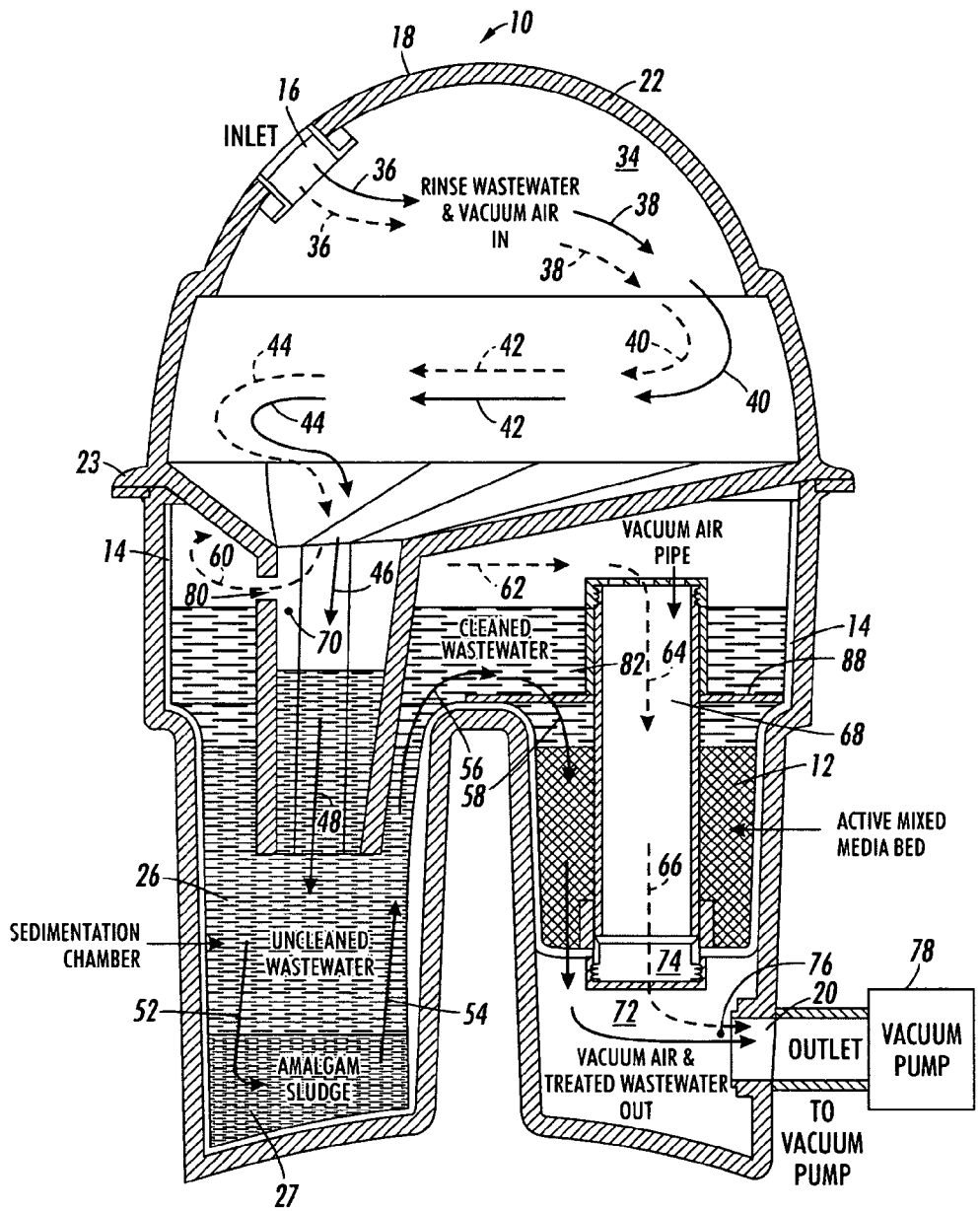
FIG. 1 is a schematic diagram of one preferred amalgam separator device.

FIG. 1 is a schematic diagram of one embodiment of an amalgam separator device 10. In this diagram, air flow is shown by dotted line arrows, and fluid flow is shown by solid arrows.

Referring again to FIG. 1, filter media 12 is preferably disposed in basket 14. A clearer depiction of basket 14 is contained in FIG. 2.

Figure 2:
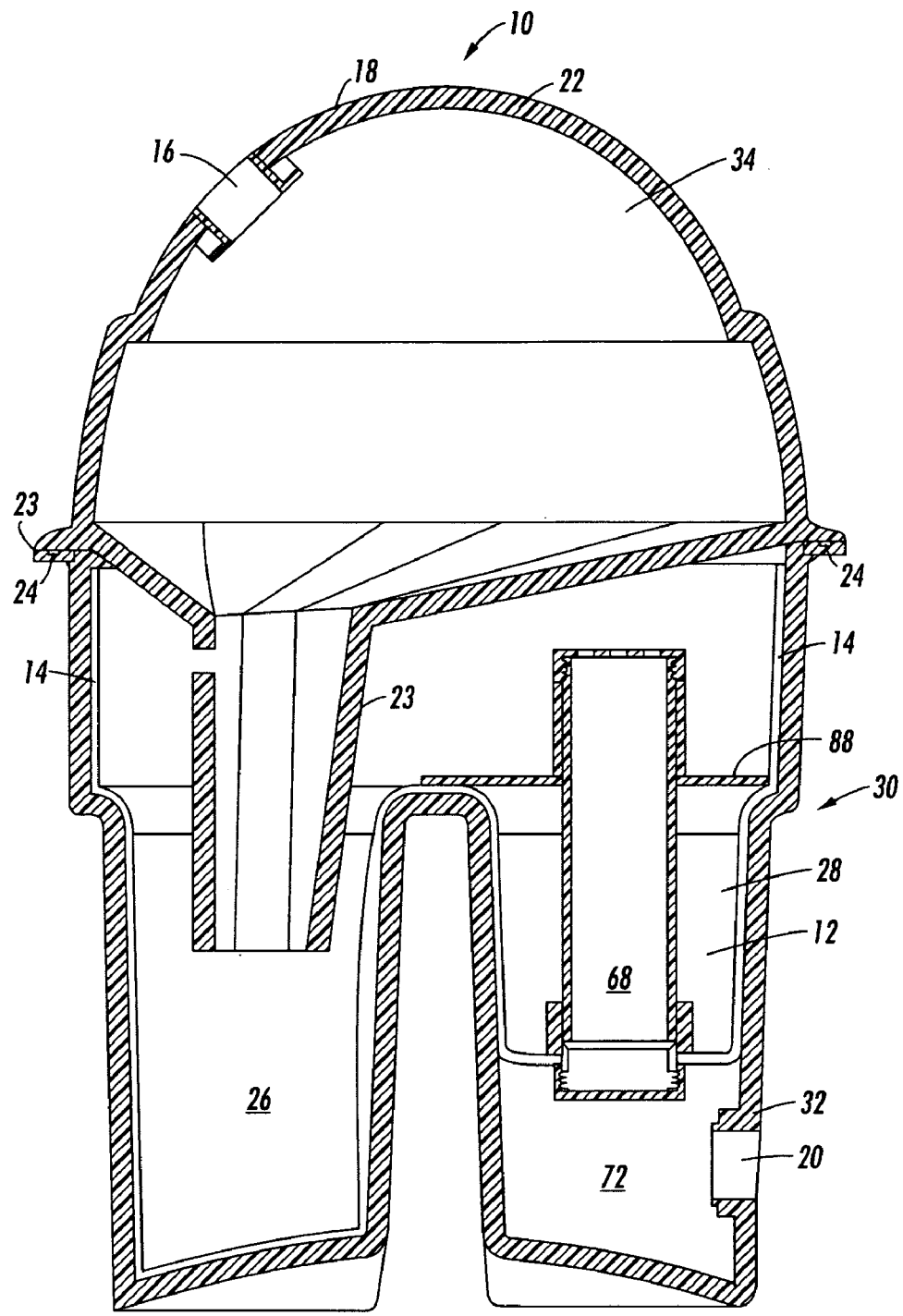
FIG. 2 is a partial schematic diagram of the amalgam separator of FIG. 1.

Referring to FIG. 2, dental waste water (not shown) flows through inlet port 16 at the top 18 of the apparatus and exits via an outlet 20 at the bottom or base of the apparatus.

In the embodiments depicted in FIGS. 1 and 2, the lid 22 functions to provide the inlet 16 and, additionally, provides liquid, particulate, and air separation chambers.

In the embodiment depicted, a mechanical connection 23 and an O-ring seal (24) is used to connect the lid 22, the sedimentation chamber 26, and filtration chamber 28 to the body 30. As will be seen by reference to FIG. 2, body 30 is comprised of base 32 and lid 22.

Figure 3:
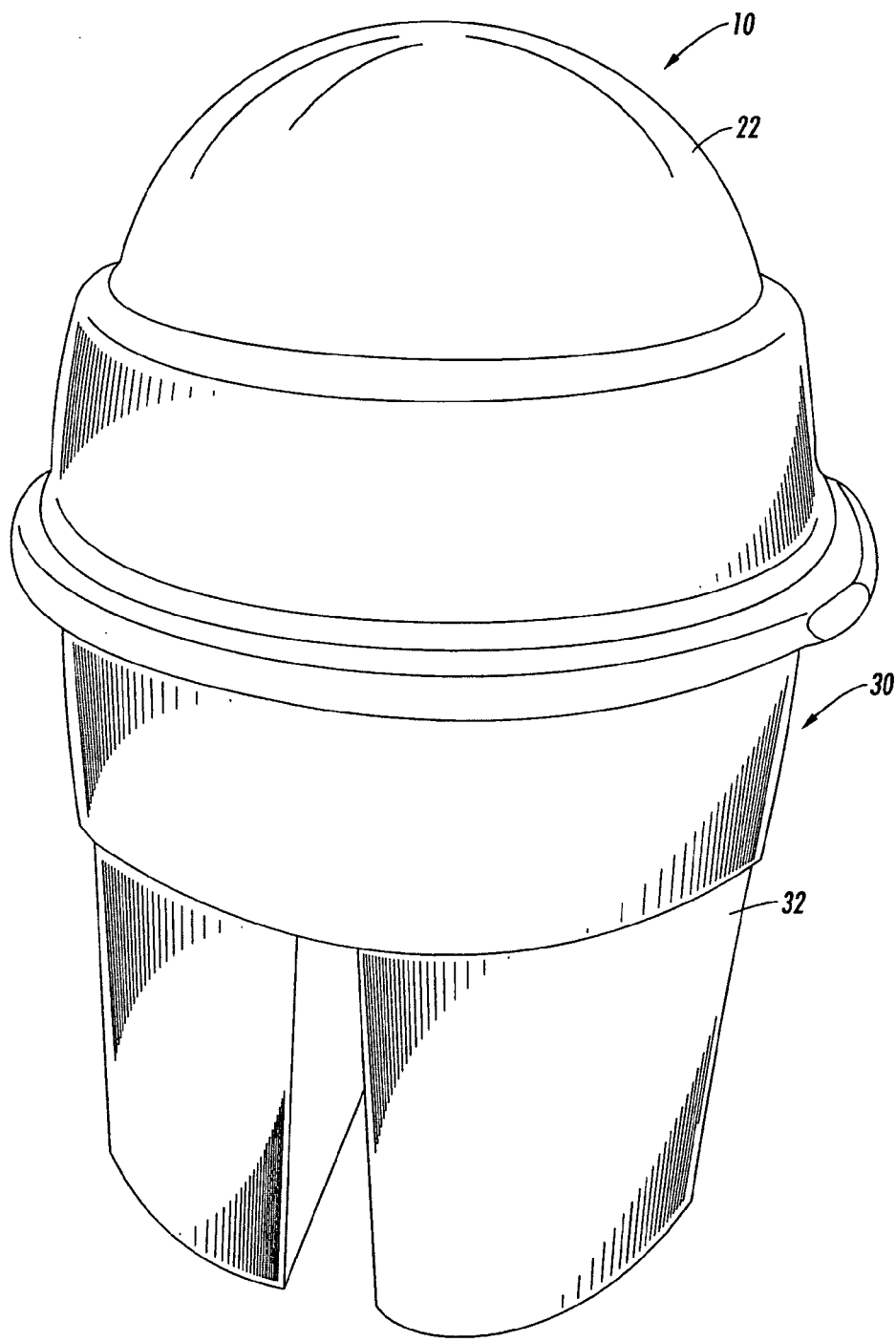
FIG. 3 is a perspective view of the amalgam separator of FIG. 1.

The seal 24 is preferably liquid and vacuum tight. Without wishing to be bound to any particular theory, applicants believe that the Referring again to FIG. 2, and also to FIG. 3, the lid 22 has a substantially arcuate shape. This is best shown in FIG. 3. Although applicants do not wish to be bound to any particular theory, they believe that this substantially arcuate shape improves the durable, leak-proof operation of the device 10.

In one embodiment, the base 32, which contains the sedimentation chamber 26 and the filtration chamber 28, may be disconnected from the dome-shaped lid 22 by releasing the mechanical connection 23.

Referring again to FIG. 1, and also to FIG. 2, and to the preferred embodiment depicted therein, the dental mixture (not shown) enters the apparatus 10 through the inlet 16. The inlet 16 is preferably located in the lid 22, which also functions as a separation chamber 34. In this chamber 34, the liquid and particulate matter are directed in the direction of solid arrows 36, 38, 40, 42, 44, 46, and 48 towards the sedimentation zone 26. From sedimentation chamber 26, the waste water flows via arrows 52, 54, 56, and 58 into the filtration chamber 28, wherein it contacts the media 12.

By comparison, the air flows via dotted arrows 36, 38, 42, 44, 60, 62, 64, and 66 through vacuum air pipe 68 and thence out through outlet 20.

In one embodiment, the partial pressure of the air at inlet 16 is substantially identical to the partial pressure of the air at outlet 20, being within about plus or minus 10 percent thereof and there is no substantial pressure drop from inlet 16 to outlet 20.

Without wishing to be bound to any particular theory, applicants believe that the air and the water diverge in their flow paths at about point 70 due to their different densities and flow properties.

Referring again to FIGS. 1 and 2, liquid and particulate matter are collected in the sedimentation zone 26. The heavy particles collect at the base 27 of the sedimentation zone 26 due to gravity. The liquid with dissolved heavy metals rises and overflows into the active mixed media bed 12. The liquid passes through the active mixed media bed 12, assisted by gravity, and collects in the re-entrainment chamber 72. The purified water is then re-entrained with the vacuum air that flows through the orifice 74, and the air and the liquid recombine at point 76 and exit via orifice 20.

The apparatus 10, including lid 22, external body 30, and removable plastic inner basket 14, composed of the sedimentation chamber 26 and filtration chamber 28, is preferably rotationally-molded.

The Preferred Filter Media 12

In one embodiment, the filter media 12 consists essentially of a metal binding resin that preferably is an ion-exchange resin. As used herein, the term consists essentially of includes a filter media that includes at least 90 weight percent of such resin and, preferably, at least 95 weight percent. In one embodiment, the filter media is comprised of at least 99 weight percent of such ion-exchange resin.

As is known to those skilled in the art, ion exchange resins are synthetic resins containing active groups, such as sulfonic, carboxylic, phenol, or substituted amino groups. These active groups give the resin the property of combining with or exchanging ions between the resin and a solution. Reference may be had, e.g., to U.S. Pat. No. 4,619,744 (recovery of precious metals from aqueous solution), U.S. Pat. No. 5,198,021 (recovery of precious metal), U.S. Pat. No. 5,340,380 (recovery of precious metal), U.S. Pat. No. 5,338,444 (process for removing mercury from organic media which also contains arsenic), U.S. Pat. No. 5,478,540 (removal of mercury heavy metal values), U.S. Pat. No. 5,505,925 (process for removing heavy metals from soil), U.S. Pat. No. 5,744,107 (process for removing heavy metals from soil), and the like. The entire disclosure of each of these United States patents is hereby incorporated by reference into this specification.

In one preferred embodiment, the ion exchange resin is a "DOWEX" ion exchange resin sold by the Dow Chemical Company of Midland Michigan. These "DOWEX" resins are synthetic ion-exchange resins made from styrene-divinylbenzene copolymers having a large number of ionizable groups or functional groups attached to the hydrocarbon matrix. In one aspect of this embodiment, the "DOWEX" resin used is "DOWEX MARATHON MSA."

In another preferred embodiment, the ion exchange resin is a metal binding resin, particularly a mercury absorbing resin, such as is disclosed in published International Patent Publication WO 0130707 by James B. Cannon et al., wherein it is disclosed that suitable mercury absorbing resins include ". . . Keyle:XO resin, manufactured by and available from SolmeteX (Billerica, Mass.). Other mercury absorbing resins, however, may be used, for example, Duolite GT-73 (Rohm and Haas, Philadelphia, Pa.), Ionac SR-4 (Sybron, Birmingham, Pa.), S-930 (Purolite, Bala Cynwyd, Pa.), Mersorb (ALCOA, Pittsburgh, Pa.), and Lewatit TP 214 (Bayer AG Leverkusen, Pittsburgh, Pa.)."

In one preferred embodiment, described below, the filter media, in addition to containing an ion-change resin, also contains dispersed within such resin a small particulate sulfur-containing material. In one aspect of this embodiment, the sulfur-containing material has a particle size distribution such that at least 95 weight percent of the particles of such material have a maximum dimension within the range of from about 0.5 to about 1.5 millimeters. As will be apparent to those skilled in the art, the maximum dimension of a spherical particle is its diameter.

In one embodiment, at least about 96 weight percent of the sulfur-containing particles have a maximum dimension within the range of from about 0.6 to about 1.4 millimeters. In yet another embodiment, at least about 97 weight percent of the sulfur-containing particles have a maximum dimension within the range of from about 0.9 to about 1.1 millimeters.

Such sulfur-containing particles are preferably homogeneously dispersed within such ion-exchange resin; and such dispersion may be effected by conventional means.

In one embodiment, the resin used is "DOWEX MARATHON MSA Anion Exchange Resin" sold by the Dow Chemical Company of Midland, Mich. This resin has the appearance of white to amber beads, and such beads have a density of 44 pounds per cubic foot.

The "DOWEX MARATHON MSA" resin is believed to be a strong base resin, as is disclosed in published United States patent application 2006/0074257, the entire disclosure of which is hereby incorporated by reference into this specification. As is disclosed in such publication, "Commercially available examples of strong base resins that are possible to use are Amberlyst A26 OH, Amberjet 4400, Amberjet 4600, Amberlite IRA400, Amberlite IRA900, Amberlite IRA910, Amberlite IRA958 and Duolite AP143, each of which is available from Rohm and Haas Company of Philadelphia, Pa. In addition, Dow Chemical, located in Midland, Mich., offers suitable strong base ion exchange resins, including, but not limited to, Dowex Monosphere Al-400, Dowex Monosphere 550A (OH), Dowex RPU, Dowex 21K XLT, Dowex 21K 16/30, Dowex 21K 16/20, Dowex Marathon A2 and Dowex Marathon MSA. Bayer of Leverkusen, Germany also sells suitable strong base ion exchange resins under the trade names Lewatit M510 and Lewatit Monoplus MP500. Purolite A600, commercially available from Purolite of Pontyclum, Wales Great Britain, and Reillex HPQ, available from Reilly Industries of Indianapolis, Ind., are also suitable strong base ion exchange resins."

In one embodiment, one may use a weak base resin. Some of these resins are also disclosed in published patent application US2006/0074257, wherein it is stated that: "Commercially available examples of weak base resins suitable for use in the process of the present invention are: Amberlyst A21, Amberlyst A23, Amberlyst A24, Duolite A561, and Duolite A7, each available from Rohm and Haas Company; Dowex Monosphere 77 and Dowex Monosphere 66, available from Dow Chemical; Lewatit MP 62, available from Bayer; Purolite A100 available from Purolite; and Reillex 402, Reillex 425, and Reillex HP, each available from Reilly industries."

In one embodiment, the resin used is a strong-base ion exchange resin that contains quaternary ammonium groups, including both type 1 and type 2 resins. By way of illustration, some such resins include, e.g., the Amberlyst A26 OH (type 1) and Amberjet 4600 (type 2) resins mentioned in published U.S. patent application 2006/0074257.

When the resin is in the form of beads (such as the DOWEX resin), it is preferred to mix such beads with granulated absorbent such as, e.g., the granulated carbon discussed elsewhere in this specification. Without wishing to be bound to any particular theory, applicants believe that the granulated carbon is absorbed onto the surfaces of the beads of resin.

Referring again to FIGS. 1 and 2, the filter media 12 preferably is a mixture of at least two different materials, one of which is an ion-exchange resin, and the other which is a sulfur-containing material. The filter media, in one aspect of this embodiment, is comprised of from about 25 to about 60 weight percent of such ion-exchange resin and from about 75 to about 40 weight percent of such sulfur-containing material. In another aspect of this embodiment, the filter media is comprised at least about 50 weight percent of such sulfur-containing material and, more preferably, at least about 60 weight percent of said sulfur-containing material.

Referring again to FIGS. 1 and 2, and in one embodiment thereof, the filter media 12 also is comprised of a sulfur-containing absorbent material such as, e.g., sulfur-containing carbon. In one preferred embodiment, the sulfur-containing material is sulfur-containing carbon that has the particle size distribution described elsewhere in this specification.

In one embodiment, the carbon used is activated carbon. As is known to those skilled in the art, activated carbon is an amorphous form of carbon characterized by high adsorptivity for many gases, vapors, and colloidal solids. Reference may be had, e.g., to U.S. Pat. No. 5,891,324 that discloses and claims "1. An adsorbent for adsorbing mercury or mercury compounds contained in liquid hydrocarbons, the adsorbent comprising an activated carbon containing hydrochloric acid, wherein the activated carbon has more than 80 ml/g of micropore volume having radii less than 8 angstroms." The entire disclosure of this United States patent is hereby incorporated by reference into this specification.

In one embodiment, the activated carbon is sold by the American Norit Company of Jacksonville, Fla. as "NORIT RBHG." As is known to those skilled in the art, these "NORIT" materials are activated absorption carbons; and the "NORIT RBHG" is an impregnated steam activated carbon that is highly porous and is adapted to readily remove mercury vapors from natural gas, air, hydrogen, and other gases. The NORIT RBH 3 is impregnated with a sulfur component to form a more stable, non-volatile mercuric sulfide.

In one embodiment, the activated carbon is a product sold by the Norit Company as RBHG-1 with a particle size such that at least about 95 percent of its particles are about 1 millimeter in diameter. This activated carbon material contains in excess of 80 weight percent of activated carbon and less than 20 weight percent of sulfur. In one embodiment, the sulfur content is from about 5 to about 15 weight percent of sulfur and from about 85 to about 95 weight percent of activated carbon. In another embodiment, the sulfur content is from about 8 to about 12 percent, and the carbon content is from about 88 to 92 percent.

As will be apparent from the foregoing description, the device 10 described hereinabove is an amalgam separation and collection apparatus for the collection and separating of amalgam in a dental vacuum waste stream. The apparatus preferably comprises four primary chambers. The separation chamber 34 is the connection point for the incoming waste flow; and once the waste flow has entered the apparatus 10, the separation chamber 34 allows the division of waste stream into vacuum air and water, and particulate amalgam. The vacuum air is permitted to flow through the unit 10 via a vacuum exhaust tube 68 and is unobstructed, The water/amalgam particulate mixture is deposited from the separation chamber into the sedimentation chamber 26. Separation by sedimentation occurs in this chamber causing the larger amalgam particles to settle to the container base 32 while the cleaned water rises, and then this cleaned water overflows and falls under gravity into the filtration chamber 28. The wastewater with trace amalgam passes through a heavy metal removal bed 12, an active mixed media bed, in the filtration chamber. The purified, virtually amalgam-free water collects in a water re-entrainment chamber located at the base of the filtration chamber 28. The collected water is introduced to the vacuum air fluid via an orifice 74 in the vacuum exhaust tubing 68. Tubing is connected to a dental office vacuum pump permitting function. The amalgam waste is retained in a removable plastic sleeve-insert, in namely the sedimentation and filtration chambers, which occupies the whole of the lower piece of the invention.

Referring again to FIG. 1, a vacuum pump 78 is connected to the outlet port 20 to maintain a substantially constant vacuum pressure between input port 16 and outlet port 20. Input port 16 is connected to a line (not shown) which, in turn, is connected to a source of the dental waste water (not shown). In one aspect of this embodiment, the device 10 is connected to patient (not shown) with a tube extending from the oral cavity of the patient (not shown) to the inlet 16 of the apparatus. A second tube (not shown) connects from the outlet 20 of the apparatus to the vacuum pump 78 commonly found in a dental office.

The inlet port 16 receives the suspended mixture of amalgam and other waste particulate, liquid and air. The mixture is separated within the lid 22 which has a sufficient void capacity to act as a separation chamber. The separation permits the vacuum air to separate and flow via an orifice 80 in the lid to an exit tube 68.

Figure 4:
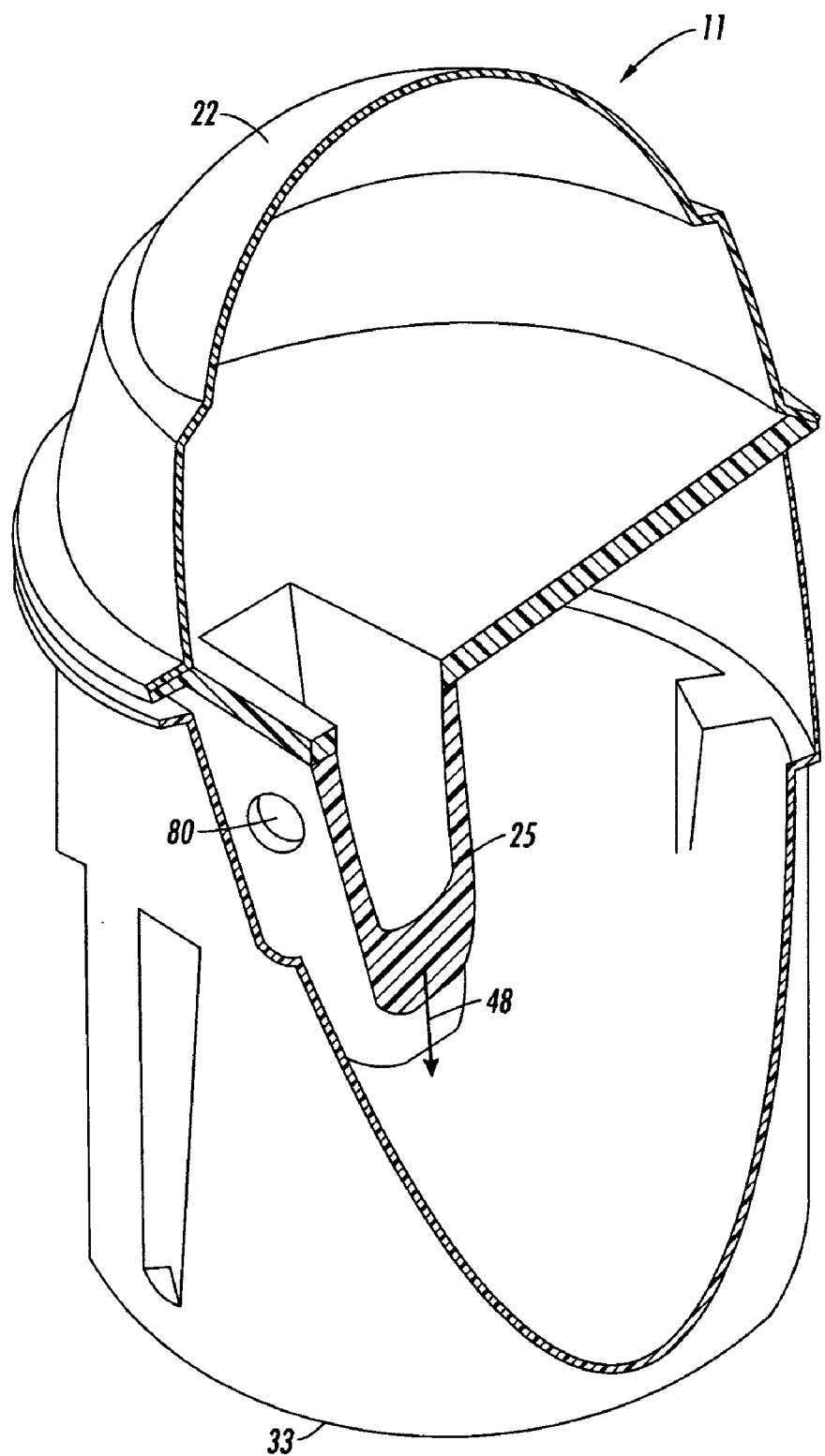
FIG. 4 is a cutaway view of one preferred lid assembly used in the amalgam separator device.

FIG. 4 is a cutaway view of one embodiment of the device 10, illustrating one preferred means of separating such mixture comprised of liquid and air. This device 11 differs from device 10 in that, e.g., its base 33 differs from base 32.

Referring again to FIG. 4, and to the preferred embodiment depicted therein, the liquid and particulate matter flow down an extension 25 of the lid 22 which then permits the liquid and particulate to flow down in the direction of arrow 48 into the sedimentation chamber (not shown in FIG. 4, but see chamber 26 of FIGS. 1 and 2) In the embodiment depicted, the sedimentation chamber (not shown) is inside a separate removable plastic sleeve (not shown) that mimics the lower shape of the bottom exterior half of the apparatus 11. Particulate within the mixture settles in the sedimentation chamber side of this removable inner sleeve.

Referring again to FIGS. 1 and 2, the cleaned liquid relocates to the upper portion 82 of the removable inner sleeve side of the sedimentation chamber, as, due to the force of gravity, more of the uncleaned liquid mixture falls into the sedimentation chamber from the separation chamber. The volume of the particulate-sediment at the bottom of the sedimentation chamber increases, forcing the cleaner level of liquid to rise.

The cleaner liquid in portion 82 then overflows and passes into and then through an active mixed media bed 12 located in the filtration chamber 28 on the opposite side of the sedimentation chamber 26, within the same plastic removable sleeve 14 . This filtration chamber 28 is located inside the base 32 of the apparatus. The filtration chamber 28 is housed within the removable plastic sleeve 14 and contains a mixed active media bed 12 designed for optimal removal of heavy metals suspended in liquid. The mixed active media bed is supported in the filtration chamber 28, preferably by a mesh 88 created by perforating the bottom of the plastic sleeve area 14 that supports the mixed active media bed.

Figure 5:
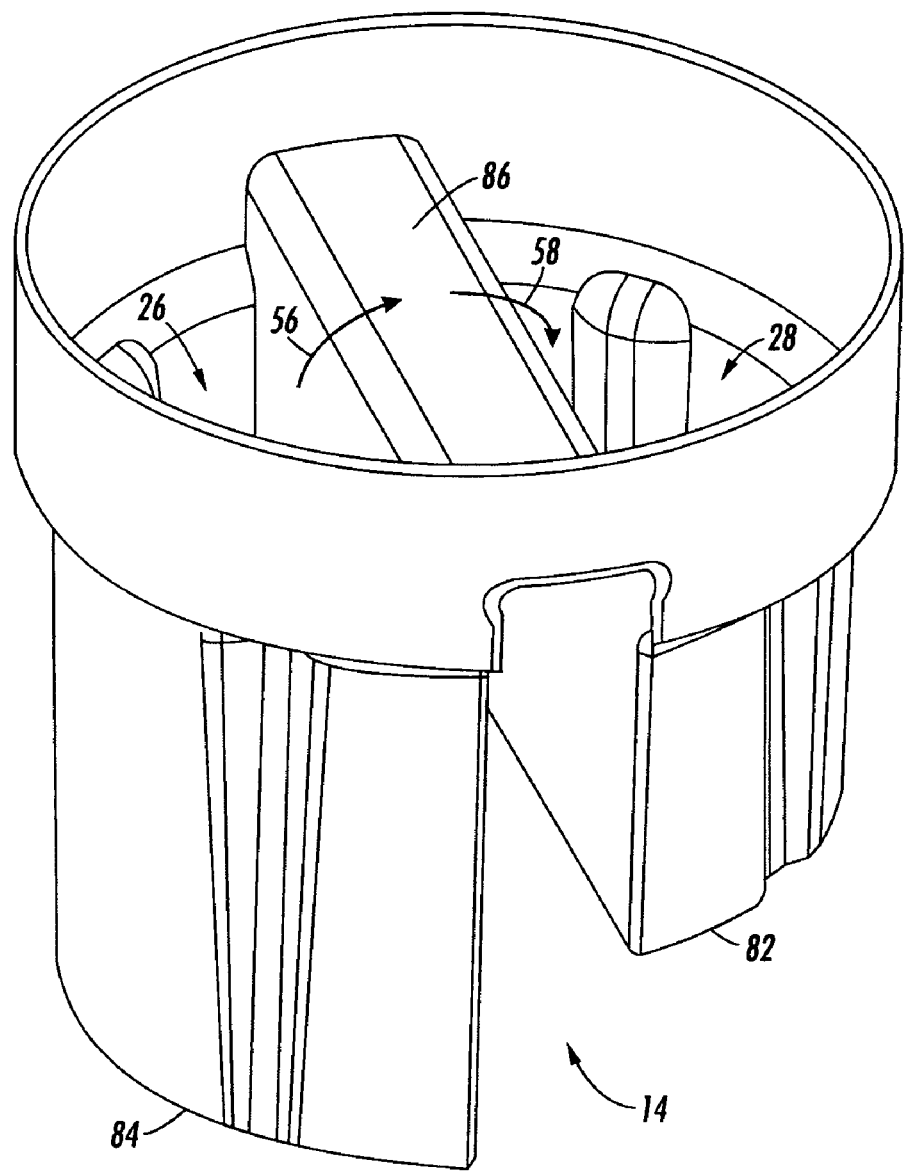
FIG. 5 is a perspective view of one preferred basket assembly used in the amalgam separator device.

Referring to FIGS. 2 and 5, it will be seen that basket 14 is comprised of a bottom section 82 of the media section and a bottom 84 of the sedimentation section.

FIG. 5 is a perspective view of one preferred basket 14 showing liquid flowing in the direction of arrows 56 (up from the sedimentation section 26) and 58 (down into the filtration section 28)

Referring again to FIG. 5, the liquid flows over divider section 86 into the filtration chamber 28 (not shown) until it contacts the bottom section 82 of the media section. The air (not shown) exits through the bottom orifice of the vacuum pipe.

Figure 6:
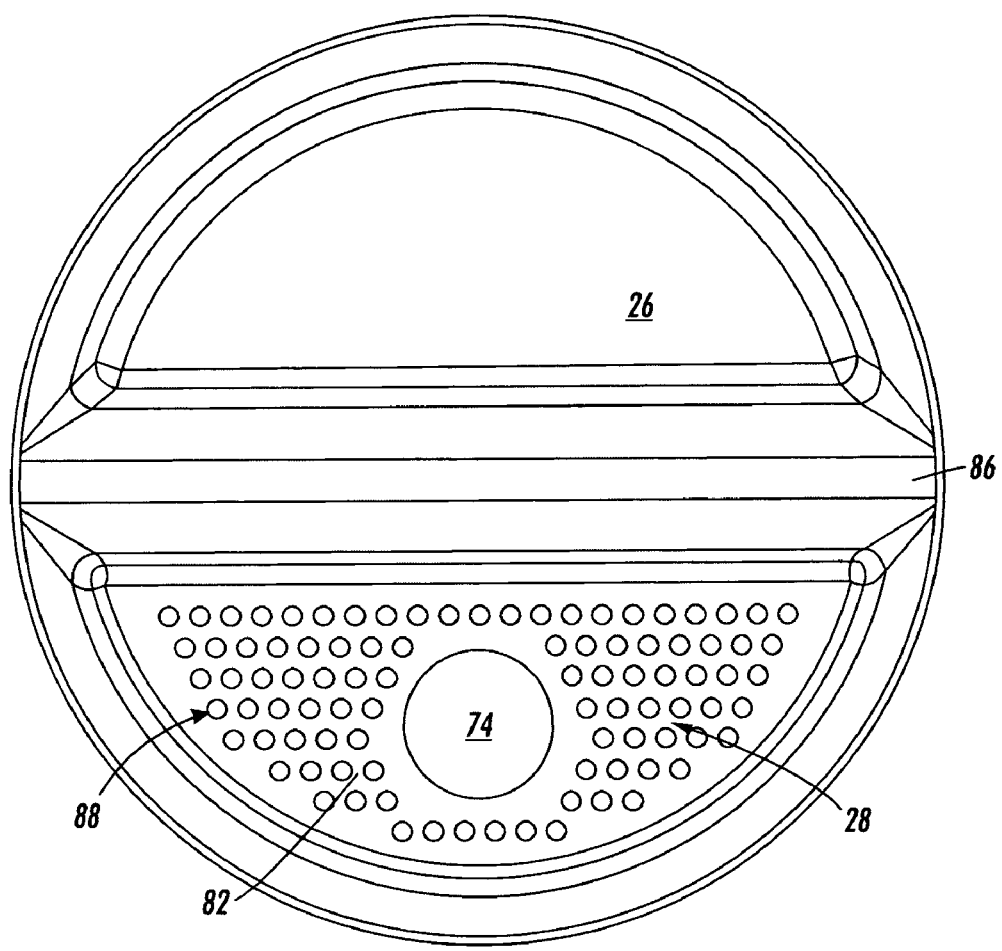
FIG. 6 is a top view of the bottom section of the basket assembly illustrated in FIG. 5.

Referring again to FIG. 6, and to the preferred embodiment depicted therein, the mesh 88 is produced by perforating the bottom of the filtration chamber 28.

Referring again to FIGS. 1 and 2, the liquid and suspended metals pass through the mixed active media bed 12 under gravity and collect in a chamber 72 below and outside the perforated bottom 88 of the plastic sleeve 14 that is part of the filtration chamber 28. The outlet 20 of the unit 10 connects the now-purified liquid to the vacuum pump 78 through tubing (not shown) attached to the exit orifice 20 of the apparatus. Vacuum air and purified water are re-combined at this point 76 prior to exiting the apparatus.

While the present invention has been described in relation to the drawings attached hereto, it should be understood that other and further modifications, apart from those shown or suggested herein, may be made within the spirit and scope of this invention.

In one embodiment, the amalgam separator is a container which has several parts. Each part forms a chamber in which one function of liquid and solid purification occurs. All parts connect to a body to form a complete container or apparatus. The apparatus is connected to the patient from a tube extending from the oral cavity to the inlet of the apparatus. A second tube connects from the outlet of the apparatus to the vacuum pump as found in a dental office.

In one aspect of this embodiment, the inlet part receives the suspended mixture of amalgam and other waste particulate, liquid and air. The mixture is separated within the lid which has a sufficient void capacity to act as a separation chamber. The separation permits the vacuum air to separate and flow via an orifice in the lid to an exit tube. The liquid and particulate matter flow down an extension of the lid which then permits the liquid and particulate to flow down into the sedimentation chamber. The sedimentation chamber is inside a separate removable plastic sleeve that mimics the lower shape of the bottom exterior half of the apparatus. Particulates within the mixture settle in the sedimentation chamber side of this removable inner sleeve. The cleaned liquid relocates to the upper portion of the removable inner sleeve side of the sedimentation chamber, as, due to the force of gravity, more of the uncleaned liquid mixture falls into the sedimentation chamber from the separation chamber. The volume of the uncleaned liquid at the bottom of the sedimentation chamber increases, forcing the cleaner level of liquid to rise.

In one aspect of this embodiment, the cleaner, cleaned liquid then overflows and passes into and then through an active mixed media bed located in the chamber on the opposite side of the sedimentation chamber, within the same plastic removable sleeve. This chamber is located inside the base of the apparatus. The chamber is housed within the removable plastic sleeve and contains a mixed active media bed designed for optimal removal of heavy metals suspended in liquid. The mixed active media bed is supported in the chamber by a mesh created by perforating the bottom of the plastic sleeve area that supports the mixed active media bed. The liquid and suspended metals pass through the mixed active media bed under gravity and collect in a chamber below and outside the perforated bottom of the plastic sleeve that is part of the cleaning chamber. The outlet of the unit connects the now-purified liquid to the vacuum pump through tubing attached to the exit orifice of the apparatus. Vacuum air and purified water are re-combined at this point prior to exiting the apparatus.

In this aspect, the recombination is accomplished by means of an orifice located in the exit pipe where it passes through the re-entrainment chamber.

In another embodiment, the amalgam separator collects solids and purifies liquid while permitting the unobstructed flow of vacuum air through the unit. This function ensures the environment is protected from possible pollution while not obstructing the volume or flow of the vacuum air and thus ensuring acceptable vacuum to ensure dental procedures are not obstructed.

In another embodiment, the amalgam separator is reduced in size and carries a smaller media charge. In one aspect of this embodiment, the bottom section of the body has been changed to a full circumference base section to increase the unit's strength under vacuum.

We claim:

1. An amalgam separator for purifying a waste stream comprised of a mixture of air and waste liquid water, wherein said amalgam separator is comprised of filter media that comprises a sulfur-impregnated carrier and an ion exchange resin, wherein the ion exchange resin is present at a concentration of from about 25 to about 75 weight percent, by combined weight of such carrier and such resin, wherein said amalgam separator is further comprised of means for separating said air from said waste water to produce separated air and separated waste water, means for removing particulate matter from said separated waste water to produce cleaned waste water, means for purifying said cleaned waste water to produce purified water, and means for combining said separated air and said purified water, and wherein:
   (a) said amalgam separator is comprised of a base and a lid, wherein said lid is removably attached to said base;
   (b) said means for removing particulate matter from said separated wastewater comprises a sedimentation chamber;
   (c) said means for purifying said cleaned waste water comprises a filtration chamber comprising said filter media;
   (d) said means for combining said separated air and said purified water comprises a perforated plate; and
   (e) said amalgam separator is comprised of a removable plastic inner sleeve which houses said sedimentation chamber and said filtration chamber, wherein said sedimentation chamber is connected to and separated from said filtration chamber by a divider, and wherein said filtration chamber is comprised of said filter media and, disposed below said filter media, an orifice.

2. The amalgam separator as recited in claim 1, wherein said lid is comprised of a chamber and an interconnection orifice.

3. The amalgam separator as recited in claim 1, wherein said lid has a substantially arcuate shape.

4. The amalgam separator as recited in claim 3, wherein said lid is comprised of an inlet port for receiving said mixture of air and waste liquid.

5. The amalgam separator as recited in claim 4, wherein said sulfur-impregnated carrier is a sulfur-containing material that has a particle size distribution such that at least 95 weight percent of the particles in such material have a maximum dimension of from about 0.5 to about 1.5 millimeters.

6. The amalgam separator as recited in claim 5, wherein said ion exchange resin is a strong base resin.

7. The amalgam separator as recited in claim 5, wherein said ion exchange resin is a weak base resin.

8. The amalgam separator as recited in claim 5, wherein said sulfur containing material is a sulfur-containing carbon material.

9. The amalgam separator as recited in claim 8, wherein said carbon material is an activated carbon material.

10. The amalgam separator as recited in claim 9, wherein said activated carbon material has a particle size distribution such that at least about 95 percent of its particles are smaller than 1 millimeter.

* * * * *